(12) United States Patent
Moore et al.

(10) Patent No.: US 8,581,922 B2
(45) Date of Patent: *Nov. 12, 2013

(54) SYSTEM AND METHOD FOR MONOCHROMATIC TINTING USING SATURATION MAPS

(71) Applicant: Disney Enterprises, Inc., Burbank, CA (US)

(72) Inventors: Matthew Moore, Jamaica Plain, MA (US); Jackson B. Dunstan, Sherman Oaks, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/691,321

(22) Filed: Nov. 30, 2012

(65) Prior Publication Data

US 2013/0100155 A1    Apr. 25, 2013

Related U.S. Application Data

(63) Continuation of application No. 12/319,616, filed on Jan. 9, 2009, now Pat. No. 8,330,769.

(51) Int. Cl.
| | |
|---|---|
| *H04N 1/40* | (2006.01) |
| *H04N 1/60* | (2006.01) |
| *H04N 1/62* | (2006.01) |
| *G09G 5/00* | (2006.01) |
| *G09G 5/02* | (2006.01) |
| *G06K 9/00* | (2006.01) |
| *G06K 9/40* | (2006.01) |
| *G06K 9/36* | (2006.01) |
| *G06F 3/00* | (2006.01) |
| *G06F 3/048* | (2013.01) |

(52) U.S. Cl.
USPC ........... 345/589; 345/594; 345/606; 345/619; 345/549; 358/537; 358/448; 382/162; 382/254; 382/274; 382/276; 382/305; 715/700; 715/764

(58) Field of Classification Search
USPC ......... 345/581, 589–594, 600–601, 604, 606, 345/619, 629–630, 501, 548–549, 690; 358/517–520, 523–525, 537–538, 540, 358/448, 452–453; 382/162, 167, 254, 274, 382/276, 305, 300, 307, 311; 715/700, 733, 715/744, 764, 781, 866–867
See application file for complete search history.

(56) References Cited

U.S. PATENT DOCUMENTS

| | | | | |
|---|---|---|---|---|
| 5,469,536 | A * | 11/1995 | Blank ........................... | 345/594 |
| 8,330,769 | B2 * | 12/2012 | Moore et al. .................. | 345/589 |
| 2003/0142140 | A1 * | 7/2003 | Brown et al. ................. | 345/803 |
| 2008/0231902 | A1 * | 9/2008 | Roome et al. ................. | 358/2.1 |
| 2008/0235047 | A1 * | 9/2008 | Broderick et al. ............... | 705/1 |
| 2009/0217187 | A1 * | 8/2009 | Kendall et al. ................ | 715/765 |
| 2010/0177109 | A1 * | 7/2010 | Moore et al. .................. | 345/589 |

* cited by examiner

*Primary Examiner* — Wesner Sajous
(74) *Attorney, Agent, or Firm* — Farjami & Farjami LLP

(57) ABSTRACT

There are provided systems and methods for tinting an image by monochromatic tinting using saturation maps for use by an application providing a user interface supporting customizable tinted images. By using saturation map and a monochromatic value map derived from the image and configuring the saturation map to specify areas for tinting, a tint color can be applied to the image by a series of quickly processed arithmetic calculations. This provides a lightweight and high quality method for tinting images within an application without wasting unnecessary network bandwidth or processor resources. Furthermore, the method can be adapted to apply multiple tint colors for multiple tints or use an alpha channel to restore color information lost due to the monochromatic value map. The resulting tinted image can also be used as a texture for a three-dimensional rendering engine.

15 Claims, 4 Drawing Sheets

SYSTEM AND METHOD FOR MONOCHROMATIC TINTING USING SATURATION MAPS

This is a continuation of application Ser. No. 12/319,616 filed Jan. 9, 2009.

BACKGROUND OF THE INVENTION

1. Field of the Invention

The present invention relates generally to processing of digital data. More particularly, the present invention relates to systems for manipulating image data.

2. Background Art

Providing graphics customization for video games, productivity, and other applications is often an appreciated function adding significant value for users. However, many applications tend to use client and server computing resources inefficiently to achieve certain graphical customization effects, resulting in slow and unresponsive interfaces, which frustrates users. In an online Internet context, bandwidth heavy applications may overload the capacity of unprepared servers, resulting in service delays or outages. Additionally, users with slower Internet connections may grow frustrated with long download times required by many applications, with users finally giving up and looking elsewhere for Internet content. To prevent this kind of user migration, it is imperative to provide a pleasant and responsive user experience scalable to a broad range of hardware configurations and Internet connectivity speeds.

The same underlying principle also applies to development in regards to content creators, the developers who make the creative content to be used in the applications. Complicated technical and procedural guidelines may restrict workflow processes and impede content creation, causing stress and the feeling of wasted effort, which may negatively impact the final work product. Conversely, as the content creation process becomes easier and more intuitive, content creators can explore the depths of their creative ideas with renewed motivation and higher productivity, improving the quality of the content for end users.

As discussed, one problem plaguing certain applications is the inability to use lightweight yet effective and visually appealing ways to accomplish certain visual effects. Content creators are often forced to create duplicitous custom content using time-consuming workarounds to implement a desired effect, wasting development time and scarce resources. Alternatively, the application may implement an inefficient and resource intensive programmatic method to provide the desired visual effect, resulting in a low quality user experience.

Accordingly, there is a need to overcome the drawbacks and deficiencies in the art by providing a way for applications to accomplish certain custom visual effects in a manner that makes efficient use of server and client resources while facilitating smooth content development workflows.

SUMMARY OF THE INVENTION

There are provided systems and methods for tinting an image by monochromatic tinting using saturation maps for use by an application providing a user interface supporting customizable tinted images, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present application is directed to a system and method for tinting an image by monochromatic tinting using saturation maps for use by an application providing a user interface supporting customizable tinted images. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
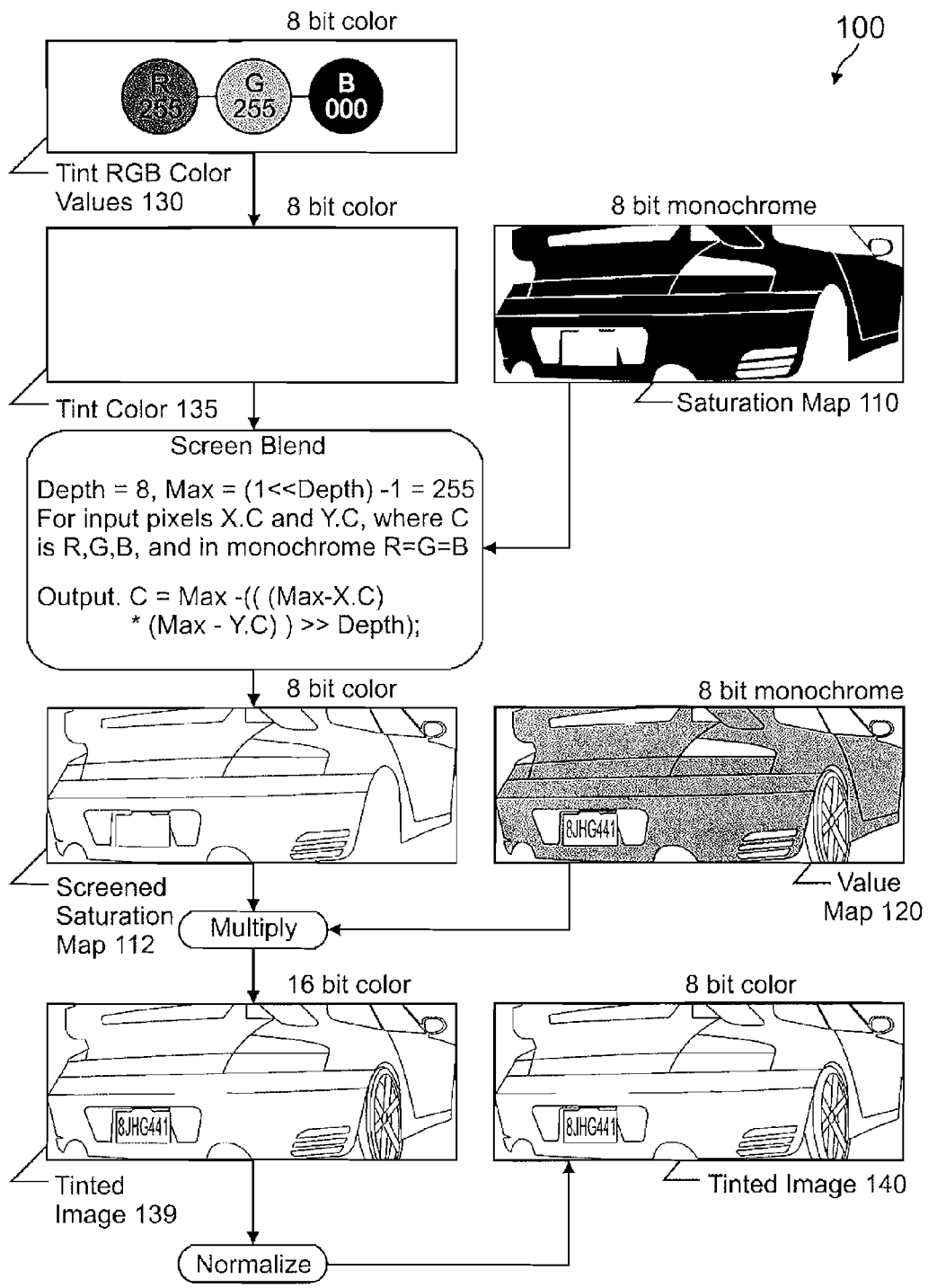
FIG. 1 shows a flowchart visually describing the steps, according to one embodiment of the present invention, by which a processor running an application can tint an image by monochromatic tinting using saturation maps.

FIG. 1 shows a flowchart visually describing the steps, according to one embodiment of the present invention, by which a processor running an application can tint an image by monochromatic tinting using saturation maps. Tinting flowchart 100 includes saturation map 110, inverted saturation map 111, screened saturation map 112, value map 120, tint red, green, blue (RGB) color values 130, tint color 135, tinted image 139, and tinted image 140.

In FIG. 1, an original image of a motor vehicle in defined dimensions is translated and edited into two separate mappings, saturation map 110 and value map 120. The original image might be a full color RGB image of a motor vehicle, with dimensions of 800 pixels wide by 300 pixels tall. Corresponding image maps can then be initially derived using well known conversion algorithms from a standard red, green, blue (RGB) color space to a Hue, Saturation, and Value (HSV) color model representation. Instead of specifying amounts of red, green, and blue light to be added as in RGB, HSV expresses colors by hue, or a particular shade of color such as red or yellow, saturation, or amount of color from an equivalently bright gray, and value, also termed brightness, which scales the colors from black to a pure color. The HSV color model is useful as an alternative to RGB since color intensity can be isolated within the saturation element, facilitating color manipulations that may be cumbersome to represent in RGB alone.

Value map 120 can be generated largely automatically as it represents nothing more than a monochrome rendering of the original image, since removing the saturation and hue elements leaves only the black to white value elements. However, saturation map 110 may need some programmatic or manual touchup after initially isolating the desired saturation element from the original image. A saturation map purely derived from the original image would result in tinting the entire original image with a given tint color. Generally this may not be a desirable result, as other parts of the original image may need conversion to monochrome, tinting with a different color, or simply remaining unmodified. Thus, the wheels, license plate, exhaust pipes, and other non-body motor vehicle elements of saturation map 110 are shifted towards zero saturation, as it would look unnatural for these elements to be tinted. This might be more easily obtained, by, for example, isolating the red color channel of a car with a red paint job.

Examining saturation map 110, it may be discerned that lesser saturation element values are depicted in black and denote greater saturation, whereas greater saturation element values are depicted in white and denote lesser saturation. Although this saturation scale may seem counterintuitive at first, it may be more visually natural for lower saturations to tend towards "lack of color" or white, as graphics artists are generally accustomed to "blank" drawing canvases being white. For computer systems, however, "lack of color" is generally associated with black, meaning that lower values tend towards black. Computer systems tend to use RGB representations for image data as most display technologies rely on mixing light to transmit colors, which is an additive color system where "lack of color" is black.

However, the particular scale chosen for storing saturation map 110 is arbitrary, and the scale may easily be inverted in an alternative embodiment, with associated tinting calculation steps also adjusted as necessary. In particular, if saturation map 110 is stored as a directly editable grayscale image, then the scale adopted in FIG. 1 may be preferable for editing, since representing whiter areas as less saturated may align more closely with graphics artists' intuitions. Additionally, storing saturation map 110 using a saturation scale where white corresponds to zero simplifies the screen blend step, as discussed below.

Continuing with the examination of FIG. 1, tint RGB color values 130 shows three color values, with R or red as 255, G or green as 255, and B or blue as 000. Tint RGB color values 130 are represented with a triplet of RGB color values. Tint RGB color values 130 have 8 bit color depths, with 255 being the largest expressible number in 8 bits. Thus, the values of tint RGB color values 130 indicate a maximum red, a maximum green, and a minimum blue.

In FIG. 1, the word size, or number of bits to represent a color element, is indicated to the upper-right of all image elements. Color images are represented by RGB color values, or three values in the indicated bit depth: red values, green values, and blue values. Monochrome images are represented by single monochrome values in the indicated bit depth, which are equivalent to color images having red, green, and blue values all set equal to the monochrome value.

Although tint RGB color values 130 are expressed as 8 bits per color value or 24 bits per pixel, alternative embodiments may use different RGB color spaces or color depths. For example, computer displays offering 16 bits per color value or 48 bits per pixel may become more prevalent in the future. Additionally, a recent trend towards wide gamut monitors has invalidated the traditional assumption of mapping RGB values directly into standard RGB (sRGB) gamut displays for correct colors. Color management may then be employed to translate colors correctly on wide gamut displays. Although RGB in sRGB gamut is the most prevalent method of storing image pixel data currently, future developments in display technologies may introduce new formats for storing image data, adding new primary colors to broaden gamut, for example. The principles of the present invention may still be applicable to these new formats.

Starting from the top of FIG. 1 and moving downward, one can observe that mixing tint RGB color values 130 results in a yellow color, tint color 135. For the purposes of the present example, tint color 135 is selected as a color for tinting the original image, but any arbitrary color can be used. Tint color 135 is then treated as a solid color fill image having equivalent dimensions to saturation map 110. This solid color fill image does not actually need to be generated and can be integrated within image processing calculations, but for explanatory purposes it may help clarify intermediary steps for generating tinted image 140.

After tint color 135 and saturation map 110 are prepared as inputs, a temporary image, screened saturation map 112, can be derived by screen blending the inputs. A brief algorithmic description of screen blending is given in FIG. 1. This function is equivalent to the "screen" layer-blending mode commonly available for image editing software.

To explain the screen blending step in more detail, if "inverse" is defined as taking a value and subtracting from the maximum possible value expressible in a word size of the value, then an output color element resulting from a screen blend, or "Output.C" in FIG. 1, can be generated in three steps. First, given two input pixels, or "X" and "Y" in FIG. 1, the inverse of input pixel "X" and the inverse of input pixel "Y" are multiplied together. This is represented by "(Max−X.C)*(Max−Y.C)" in FIG. 1. Second, the result from the first step is logically bit shifted right by the word size, which effectively normalizes the result by dividing by the number of possible values defined in the word size. Although logical bit shifting may only approximate a division operation, it is much faster computationally for integer operations, which can only express results in whole numbers in any case. This is represented by ">>Depth" in FIG. 1. Third, the result from the second step is itself inversed. This is represented by the first "Max−" expression in FIG. 1.

These three steps can then be repeated for each color element, or ".C" representing "R, G, B" in FIG. 1. By using the solid color fill image representing tint color 135 as input "X" and a color image version of saturation map 110 as input "Y," screened saturation map 112 can be generated as output "Output." Although saturation map 110 may be stored as a monochrome image, it can be converted to a color image version simply by setting all three color elements equivalent to a corresponding monochrome value. For example, if a monochrome pixel specifies 55, then a corresponding color pixel simply specifies 55 for red, 55 for green, and 55 for blue.

Once screened saturation map 112 is available, it can be multiplied with a color image version of value map 120. This can be accomplished by a straightforward multiplication of corresponding color elements from each input, which results in an output having double the bit depth of each original input. Thus, as shown in FIG. 1, tinted image 139 is expressed in 16 bit color.

Since the original tint RGB color values 130 were expressed in 8 bit color depths, a normalization step may convert the 16 bit color values of tinted image 139 back to the original 8 bit color depths. This normalization step can, for example, be accomplished by logically bit shifting right by the color depth, or right by 8 bits. This is approximately equivalent to dividing by the number of possible values defined in 8 bits, or 256. The result is tinted image 140, expressed in 8 bit color values. Thus, the desired result is generated as tinted image 140, where the body of the car from the original image is tinted yellow, as specified by tint RGB color values 130.

The particular steps and ordering of calculations used in FIG. 1 expresses only one possible embodiment; alternative embodiments using differing calculation steps with the same value and saturation map concepts are equally valid. The process of FIG. 1 is presented primarily for ease of understanding and not for optimization of processing workload. For example, many of the steps shown in FIG. 1 are depicted as discrete steps, but could also be grouped and combined into combined expressions for greater efficiency. Similarly, caching of results, lookup tables calculated in advance, estimations, reordering, and other optimizations can help reduce processing workload.

Figure 2:
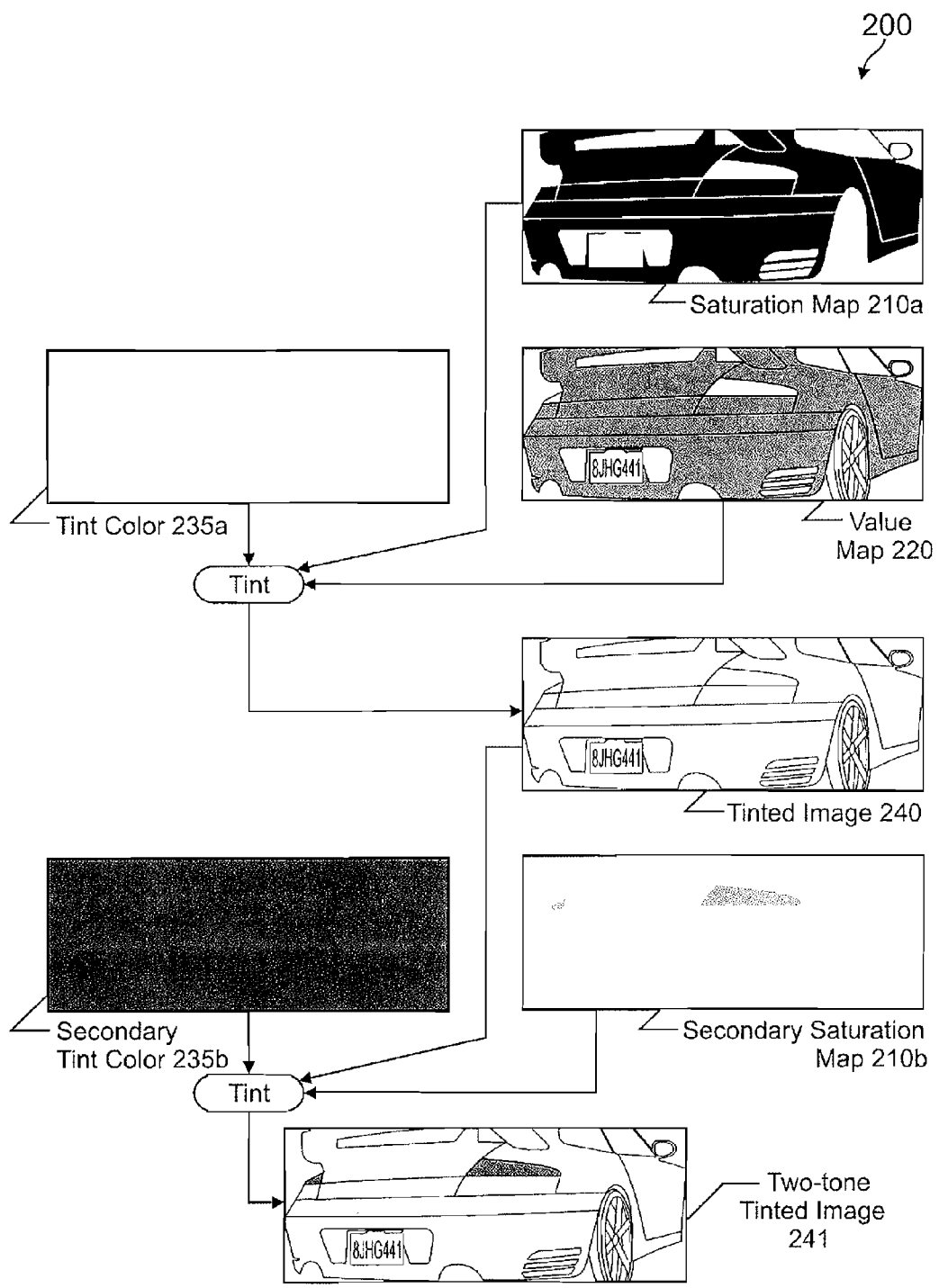
FIG. 2 shows a flowchart visually describing the steps, according to one embodiment of the present invention, by which a processor running an application can multi-tone tint an image by monochromatic tinting using multiple saturation maps.

FIG. 2 shows a flowchart visually describing the steps, according to one embodiment of the present invention, by which a processor running an application can multi-tone tint an image by monochromatic tinting using multiple saturation maps. Two-tone tinting flowchart 200 includes saturation map 210a, secondary saturation map 210, value map 220, tint color 235a, secondary tint color 235b, tinted image 240, and two-tone tinted image 241. Value map 220 corresponds to value map 120 from FIG. 1. Tint color 235a corresponds to tint color 135 from FIG. 1. Tinted image 240 corresponds to tinted image 140 from FIG. 1.

FIG. 2 presents an abbreviated view of the inputs for generating tinted image 240. For the process of tinting an image by a saturation map, minimum inputs of a tint color, a saturation map, and a value map are needed for the tinting process, as described in FIG. 1. In FIG. 2, these inputs are provided by tint color 235a, saturation map 210a, and value map 220, respectively. Other elements within FIG. 1 are intermediary derivatives for calculation purposes rather than independent inputs in the tinting process and are therefore omitted from FIG. 2. By using a tinting process similar to that of FIG. 1, tinted image 240 may be created from the inputs shown in FIG. 2.

Examining saturation map 210a, differences can be observed from saturation map 110 in FIG. 1. In saturation map 110, the brake lights on the motor vehicle have some saturation values and are therefore tinted somewhat yellow in tinted image 140. This may seem visually odd, as brake lights are usually tinted red. Thus, in FIG. 2, the brake lights tend towards no saturation in saturation map 210a, resulting in a mostly grayscale render of the brake lights in tinted image 240. From there, another pass of the tinting process can tint the brake lights towards a red color. Similarly, if a two-tone paint job on the motor vehicle body is desired, another pass of the tinting process could apply the second paint tone.

Thus, in situations where tint colors of independent hue need to be tinted to an image, a single saturation map in the tinting process may be insufficient. For example, the tinted images may be intended as sprites for an application using a primarily two-dimensional user interface. On the other hand, a single tint color may be sufficient for applications that overlay other color tones or image segments in real-time with tinted images. For example, applications might use tinted images as texture patterns for three-dimensional surfaces in a rendering engine, where other hues can be added simply by adding an appropriate surface to a rendering scene. A primarily two-dimensional application might apply real-time alpha channel support for overlaying of other hues or image segments. Thus, depending on the requirements of the application, a single or multi-tone tinted image may be desirable.

FIG. 2 demonstrates how the tinting procedure of FIG. 1 may utilize two saturation maps and two tint colors to generate two-tone tinted image 241. The tinting procedure can be used for as many independently hued tint colors as necessary, but diminishing returns on processor resources may result for large numbers of tint colors and saturation maps. In this case, traditional tinting methods such as indexed colors with adjustable palettes or hue shifting may provide better performance, but may require larger development resources or degrade image quality.

The second pass of the tinting procedure is mostly the same as the first pass, except that tinted image 240 substitutes for a grayscale RGB render of value map 220. Thus, the inputs to the tinting procedure include secondary saturation map 210b, secondary tint color 235b, and tinted image 240 acting as a value map. As shown in FIG. 2, secondary saturation map 210b only applies saturation to the brake light areas, and secondary tint color 235b is shown as red, or (255, 000, 000). Otherwise, the second pass still follows a tinting process similar to FIG. 1 to generate two-tone tinted image 241.

Just as with FIG. 1, the steps of FIG. 2 represent one embodiment, and other embodiments using different calculation methods but relying on saturation map 210a and secondary saturation map 210b can also be used. For example, rather than segmenting the two-tone tinting process into two discrete passes for each saturation map, a single pass where each pixel is processed through all tint colors and saturation maps might be utilized, which might result in an optimization of processing resources.

Figure 3:
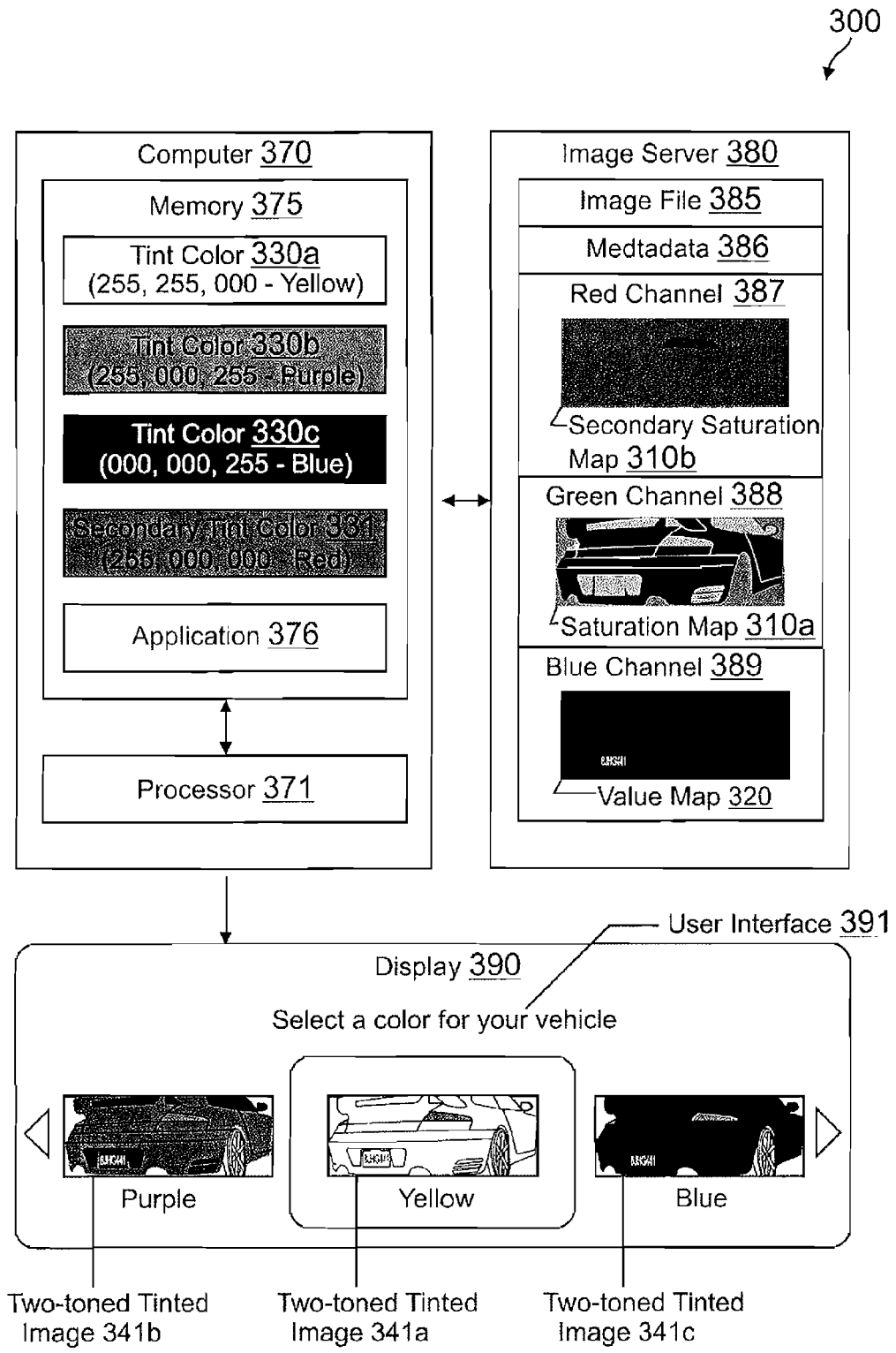
FIG. 3 shows an application environment by which a processor running an application can provide a user interface supporting customizable tinted images by monochromatic tinting using saturation maps, according to one embodiment of the present invention.

FIG. 3 shows an application environment by which a processor running an application can provide a user interface supporting customizable tinted images by monochromatic tinting using saturation maps, according to one embodiment of the present invention. Application environment 300 includes computer 370, image server 380, and display 390. Computer 370 includes processor 371 and memory 375. Memory 375 includes tint color 330a, tint color 330b, tint color 330c, secondary tint color 331, and application 376. Image server 380 includes image file 385, which contains metadata 386, red channel 387, green channel 388, and blue channel 389. Secondary saturation map 310b is embedded within red channel 387, saturation map 310b is embedded within green channel 388, and value map 320 is embedded within blue channel 389. Display 390 shows user interface 391, which includes two-toned tinted image 341a, two-toned tinted image 341b, and two-toned tinted image 341c.

FIG. 3 shows a generalized block diagram of the various parts of a system using the tinting process already described in some detail in FIGS. 1 and 2. In computer 370, processor 371 has access to memory 375, which includes tint color 330a as yellow or (255, 255, 000), tint color 330b as purple or (255, 000, 255), tint color 330c as blue or (000, 000, 255), and secondary tint color 331 as red or (255, 000,000). Additionally, processor 371 may execute application 376 to provide user interface 391 on display 390 attached to computer 370. Application 376 could comprise, for example, a Flash application, a Silverlight application, a Java application, or a natively executed binary for a personal computer, a video game console, or any other platform.

To provide user interface 391, application 376 might first query image server 380 for image file 385, which contains the HSV maps for the tinting process. Although memory 375 already has various tint colors stored, processor 371 also needs access to various HSV maps including saturation map 310a, secondary saturation map 310b, and value map 320. For ease of distribution, the HSV maps might be embedded in separate color channels of an image file, as shown in image file 385. Since each HSV map only tracks a single variable—hue, saturation, or value, the data of any HSV map can be embedded within any color channel. Thus, by embedding three HSV maps within a single RGB image as image file 385, application 376 can make one image file request to image server 380 rather than three. Processor 371 executing application 376 can then extract the HSV maps into memory 375 after image file 385 is received.

By embedding the HSV maps within a single image file, network performance between computer 370 and image server 380 may improve, as there is no need to request, acknowledge, and send three separate files. Additionally, a standardized and widely supported image file format such as PEG or PNG can be used, leveraging existing image handling libraries and code routines to take advantage of file format features such as image compression without resorting to custom code. If less HSV maps are required than the number of color channels provided by the file format, the remaining empty color channels might store other data or remain blank or unused. Furthermore, the choice of color channel for storing a particular HSV map is arbitrary, as the color channels are being used for generic data storage rather than for color information. For example, secondary saturation map 310b could be placed instead in green channel 388 or blue channel 389, but is arbitrarily placed in red channel 387. To that end, metadata 386 might provide identifying information specifying the particular contents of each color channel, or a particular channel might be assumed to always store a particular HSV map. For example, blue channels might be assumed to always carry value maps.

After processor 371 finishes extracting the HSV maps to memory 375, memory 375 will contains the inputs for generating two-tined tinted image 341a, two-tined tinted image 341b, and two-tined tinted image 341c using a process similar to that shown in FIG. 2. Once these two-toned tinted images are generated, they can be sent to display 390 as part of user interface 391, allowing a user running application 376 to pick a custom color for the motor vehicle. In the embodiment shown in FIG. 3, user interface 391 shows images tinted by predefined colors, but alternative embodiments may allow the user to choose any desired tint color by requesting a custom tint color from the user. For example, user interface 391 might display three sliders corresponding to red, green, and blue, allowing the user to adjust the tint color values according to user preference.

Once a tint color is selected, the tinted image might be used by application 376 to support, for example, a racing game, an automotive e-commerce application, a car oriented virtual community, or any other application needing customizable tinted images. Furthermore, the subject matter is not limited to motor vehicles and could apply to any object needing tinting, such as video game characters, furniture, interior design, clothing, and a myriad of other things that may need tinting. The tinted image might even be used as a surface texture in a three-dimensional renderer of application 376, as discussed above in FIG. 2.

Figure 4:
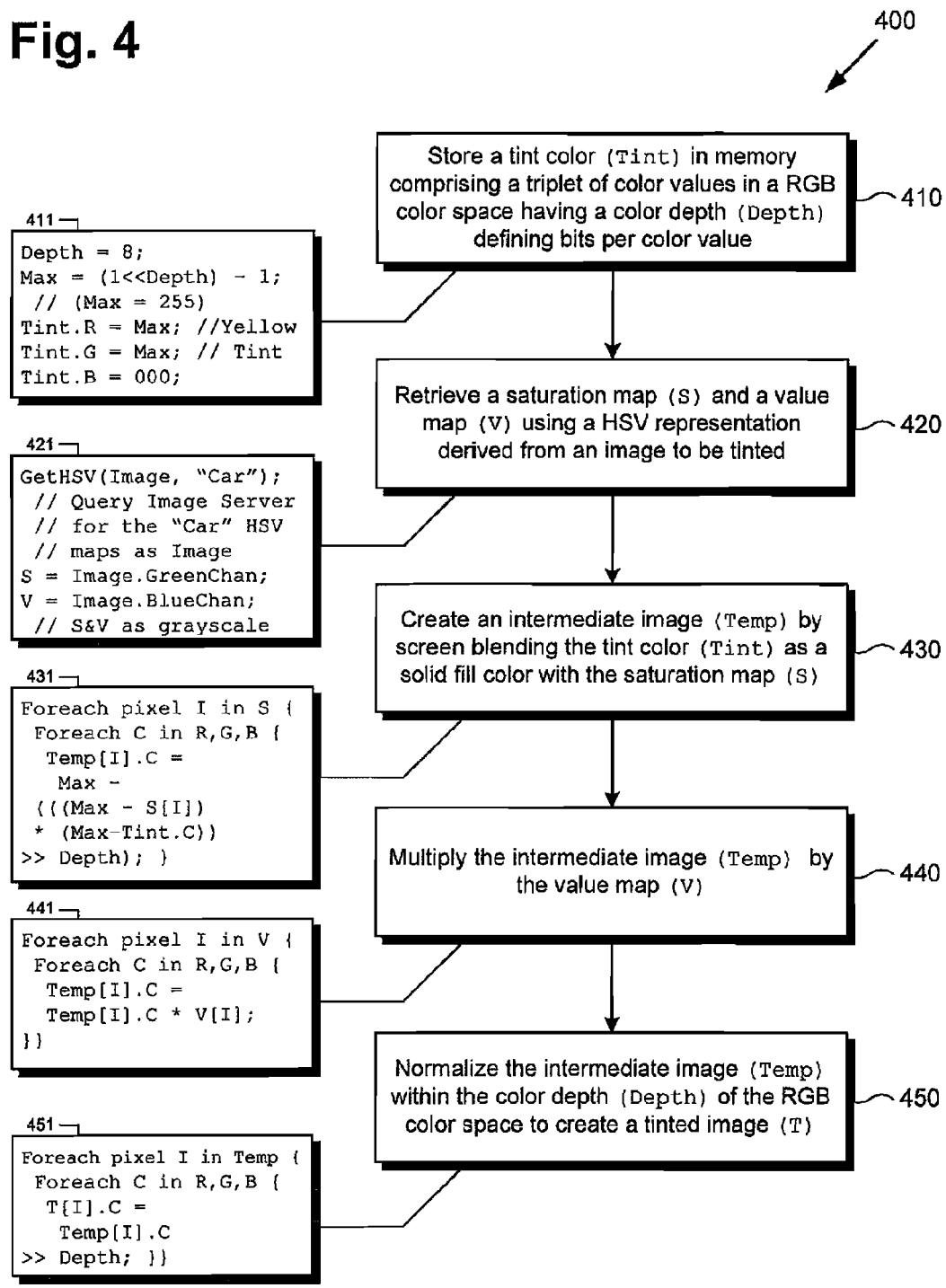
FIG. 4 shows a flowchart describing the steps, according to one embodiment of the present invention, by which a processor running an application can tint an image by monochromatic tinting using saturation maps.

FIG. 4 shows a flowchart describing the steps, according to one embodiment of the present invention, by which a processor running an application can tint an image by monochromatic tinting using saturation maps. Each step is also accompanied by a pseudo-code explanation, psuedo-code 411 through 451, using example input data from the figures. Certain details and features have been left out of flowchart 400 that are apparent to a person of ordinary skill in the art. For example, a step may comprise one or more substeps or may involve specialized equipment or materials, as known in the art. While steps 410 through 450 indicated in flowchart 400 are sufficient to describe one embodiment of the present invention, other embodiments of the invention may utilize steps different from those shown in flowchart 400.

Referring to step 410 of flowchart 400 in FIG. 4 and application environment 300 of FIG. 3, step 410 of flowchart 400 comprises processor 371 executing application 376 storing tint color 330a in memory 375 comprising a red color value at 255, a green color value at 255, and a blue color value at 000, each color value in a RGB color space having a color depth defining 8 bits per color value. These operations are illustrated in pseudo-code 411, which loosely follows C style syntax. Color depth (Depth) is set to 8 bits, and an associated maximum value (Max) is calculated by subtracting 1 from the value 1 logically bit shifted left by 8 bits. This is the same as calculating 2 by the power of 8 and subtracting by 1, but logical bit shifts may execute quicker than the arithmetic equivalent on a processor. This "Max" value is reserved in memory 375 for later use. Then, RGB color values are assigned as tint color 330a, the RGB color values forming (255, 255, 000) or yellow. In pseudo-code 411 the RGB color values are hard-coded, but they could be retrieved from image server 380, generated by application 376, or requested from a user via user interface 391.

Referring to step 420 of flowchart 400 in FIG. 4 and application environment 300 of FIG. 3, step 420 of flowchart 400 comprises processor 371 retrieving saturation map 310a and value map 320 using a HSV representation derived from a car image to be tinted. In pseudo-code 421, the GetHSV routine queries image server 380 and retrieves image file 385. After image file 385 is retrieved, the HSV maps are extracted from the color channels to a saturation map grayscale image and a value map grayscale image for storage in memory 375. In pseudo-code 421, the saturation map is hard-coded as the green channel and the value map is hard-coded as the blue channel, but the mapping to color channels could also be embedded and extracted from metadata 386 or follow some other channel mapping convention.

Referring to step 430 of flowchart 400 in FIG. 4 and application environment 300 of FIG. 3, step 430 of flowchart 400 comprises processor 371 creating an intermediate image (Temp) by screen blending tint color 330a (Tint) as a solid fill color with saturation map 310a (S). Examining pseudo-code 431, step 430 is accomplished by the same process described in the screen blend algorithm presented in FIG. 1. That is, for each color element (R, G, B) of each input pixel (pixel I in S, and Tint as a constant), the inverses of each input pixel are multiplied together, and the resulting product itself is inversed, where inversion is defined as subtracting an input from a maximum value (Max). The result is stored as a temporary intermediate image (Temp).

Referring to step 440 of flowchart 400 in FIG. 4 and environment 300 of FIG. 3, step 440 of flowchart 400 comprises processor 371 multiplying the intermediate image (Temp) from step 430 by value map 320 (V). Examining pseudo-code 441, step 440 applies a straightforward multiplication of the color elements (R, G, B) of each input pixel from the intermediate image (Temp) of step 430 and the value map (V). The intermediate image (Temp) is then updated with the resulting product.

Referring to step 450 of flowchart 400 in FIG. 4 and application environment 300 of FIG. 3, step 450 of flowchart 400 comprises processor 371 normalizing the intermediate image (Temp) from step 440 within the color depth (Depth) of the RGB color space of step 410 to create a tinted image (T). Since after step 440, the intermediate image (Temp) is stored using 16 bit color values, whereas the original tint color was specified in 8 bit color values, it may be appropriate to adjust the bit depth after step 440 so that the final image matches the bit depth of the original tint color. Thus, each pixel in the intermediate image (Temp) is logically bit shifted right by the bit depth, or 8 bits, resulting in final 8 bit color values. This result is then stored as the final tinted image (T). After step 450, "T" or the tinted image is ready to show on display 390 or undergo further manipulation by application 376. A corresponding image for "T" may look similar to tinted image 240 from FIG. 2.

After tinted image "T" is generated, application 376 may further manipulate the tinted image via a transparent layering procedure using an alpha channel to restore lost color information from the original image. For example, the license plate in the original image of the vehicle might have a colorful custom license plate, but when the original image goes through the tinting process, the color information from the custom license plate is lost in the tinted image. This color information may be restorable if an alpha channel is applied to the tinted image such that tinted areas are opaque but non-tinted areas are transparent. Then, this tinted image with an alpha channel may be layered above the original image, allowing the color information of the original image to be retained while adding the ability to tint particular areas. If empty color channels are available in image file 385, the alpha channel might also be embedded together with the HSV maps in a single image file. Alternatively, particular values within value map 320 might be reserved for transparency purposes, although this alternative method may fail to provide satisfactory results if the color depth is low, as transparent edges may exhibit artifacts due to limited alpha values.

Besides restoring color from the original image, an alpha channel might be used for supporting transparency within user interface 391 supported by application 376. For example, the car images shown in interface 391 all contain a black background, which may represent an undesirable visual artifact. In this case, an alpha channel may be applied to make the black background transparent, allowing only the car to display without the surrounding black areas, which may be more visually appealing.

As previously mentioned, it may also not be necessary to use transparency to provide additional hues, as the resulting tinted image might be used in a three dimensional renderer or another engine providing real-time transformations that may support the addition of other hues. However, for primarily two dimensional application interfaces, layering of transparency effects may provide additional flexibility for additional color manipulations.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A system for tinting an image, the system comprising:
a memory;
a display; and
a processor configured to:
obtain the image from a server via a network, the image embedding a saturation map and a value map;
extract the saturation map and the value map from the image;
store the saturation map and the value map extracted from the image into the memory;
create an intermediate image by screen blending a tint color as a solid fill color with the saturation map;
multiply the intermediate image by the value map;
normalize the intermediate image within a red, green, blue (RGB) color space of the tint color to create a tinted image;
display the tinted image in a user interface on the display; and
manipulate the tinted image based on user manipulations of the tinted image using the user interface.

2. The system of claim 1, wherein the processor is configured to execute a Flash application to display the tinted image on the display.

3. The system of claim 1, wherein the processor is configured to execute a Java application to display the tinted image on the display.

4. The system of claim 1, wherein the processor is configured to execute a Silverlight application to display the tinted image on the display.

5. The system of claim 1, wherein the processor is configured to process the tinted image in a three-dimensional renderer before displaying the tinted image on the display.

6. A method of tinting an image for use by a system having a memory, a display and a processor in communication with a server via a network, the method comprising:
obtaining the image from a server via a network, the image embedding a saturation map and a value map;
extracting the saturation map and the value map from the image;
storing the saturation map and the value map extracted from the image into the memory;
creating an intermediate image by screen blending a tint color as a solid fill color with the saturation map;
multiplying the intermediate image by the value map;
normalizing the intermediate image within a red, green, blue (RGB) color space of the tint color to create a tinted image;
displaying the tinted image in a user interface on the display; and
manipulating the tinted image based on user manipulations of the tinted image using the user interface.

7. The method of claim 6, wherein the processor is configured to execute a Flash application to display the tinted image on the display.

8. The method of claim 6, wherein the processor is configured to execute a Java application to display the tinted image on the display.

9. The method of claim 6, wherein the processor is configured to execute a Silverlight application to display the tinted image on the display.

10. The method of claim 6, wherein the processor is configured to process the tinted image in a three-dimensional renderer before displaying the tinted image on the display.

11. A software application stored in a memory of a computer for execution by a processor of the computer in communication with a display of the computer and a sever via a network, when executed by the processor, the software application performing the steps of:

obtaining the image from a server via a network, the image embedding a saturation map and a value map;
   extracting the saturation map and the value map from the image;
   storing the saturation map and the value map extracted from the image into the memory;
   creating an intermediate image by screen blending a tint color as a solid fill color with the saturation map;
   multiplying the intermediate image by the value map;
   normalizing the intermediate image within a red, green, blue (RGB) color space of the tint color to create a tinted image;
   displaying the tinted image in a user interface on the display ; and
   manipulating the tinted image based on user manipulations of the tinted image using the user interface.

12. The software application of claim 11, wherein the software application is a Flash application.

13. The software application of claim 11, wherein the software application is a Java application.

14. The software application of claim 11, wherein the software application is a Silverlight application.

15. The software application of claim 14, wherein when executed by the processor, the software application further performing the step of processing the tinted image in a three-dimensional renderer before displaying the tinted image on the display.

* * * * *